(No Model.) 2 Sheets—Sheet 1.

Q. N. EVANS.
HEATING APPARATUS FOR BUILDINGS.

No. 471,351. Patented Mar. 22, 1892.

WITNESSES:
John Becker
Fred White

INVENTOR:
Quimby N. Evans,
By his Attorneys,
Arthur C. Fraser & Co.

(No Model.) 2 Sheets—Sheet 2.

Q. N. EVANS.
HEATING APPARATUS FOR BUILDINGS.

No. 471,351. Patented Mar. 22, 1892.

WITNESSES:
John Becker
Fred White

INVENTOR:
Quimby N. Evans,
By his Attorneys,
Arthur E. Fraser & Co.

UNITED STATES PATENT OFFICE.

QUIMBY N. EVANS, OF BROOKLYN, NEW YORK.

HEATING APPARATUS FOR BUILDINGS.

SPECIFICATION forming part of Letters Patent No. 471,351, dated March 22, 1892.

Application filed November 29, 1890. Serial No. 373,025. (No model.)

*To all whom it may concern:*

Be it known that I, QUIMBY N. EVANS, a citizen of the United States, residing in Brooklyn, in the county of Kings and State of New York, have invented certain new and useful Improvements in Heating Apparatus for Buildings, of which the following is a specification.

This invention relates to hot-water or other liquid circulating apparatus for heating buildings. The apparatus comprises a liquid circuit containing water or other heat-conducting medium, a heater for heating the liquid in said circuit, radiators for giving out heat throughout the building, and means for circulating the liquid. The circulating means consists, preferably, of a pump driven by suitable power, preferably steam-power. Two successive heaters are applied to the circuit, one of which is heated by exhaust-steam under low pressure, and the other heater is heated by live steam. For regulating the heat applied to the circuit two means are provided. The first consists in a shunt around the exhaust-steam heater, so that the circulating liquid, instead of being sent through this heater, may be passed around it when it is desired to cool the circuit. The other means consists in regulating the admission of steam to the live-steam heater by means of suitable steam-valves.

The invention also includes the application of thermostatic devices to operate automatically the valves controlling the heating of the circuit.

Figure 1:
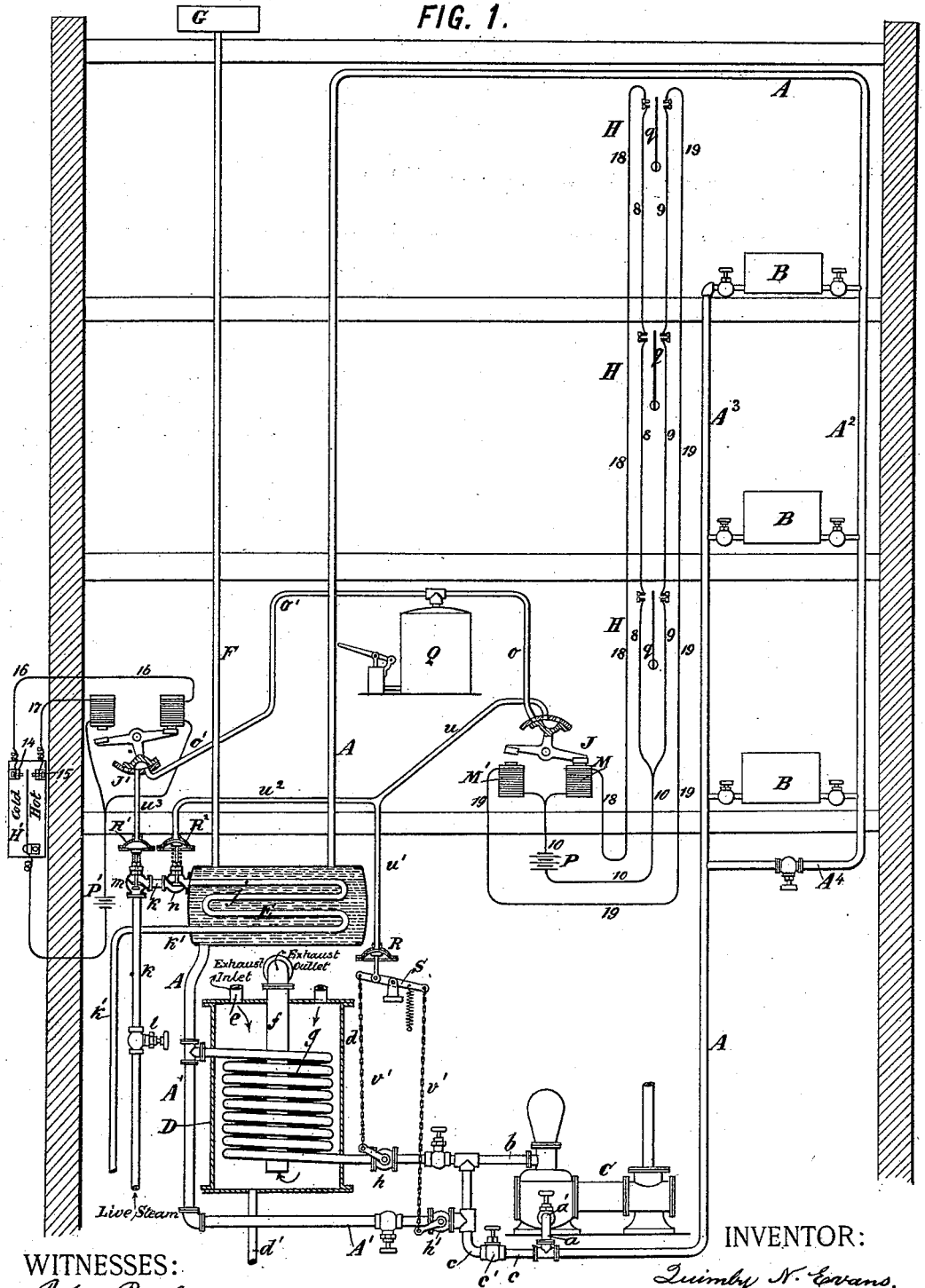
Figure 2:
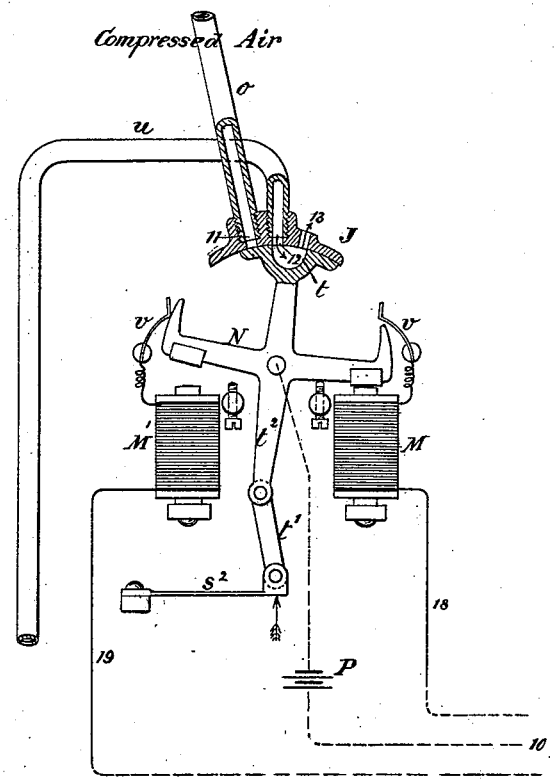
Figure 3:
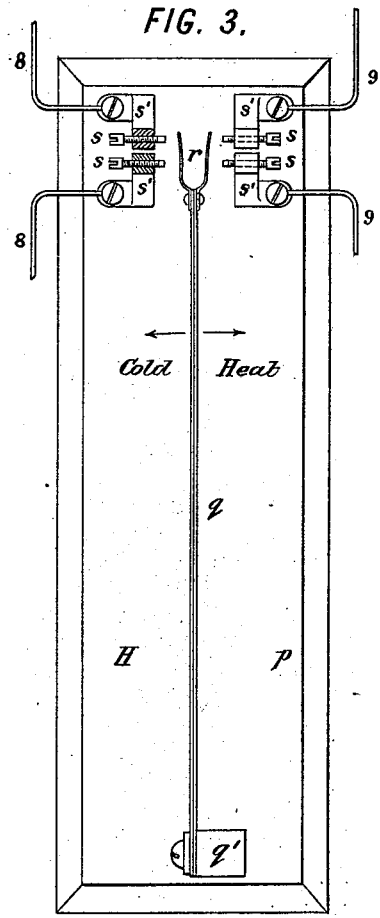
Figure 4:
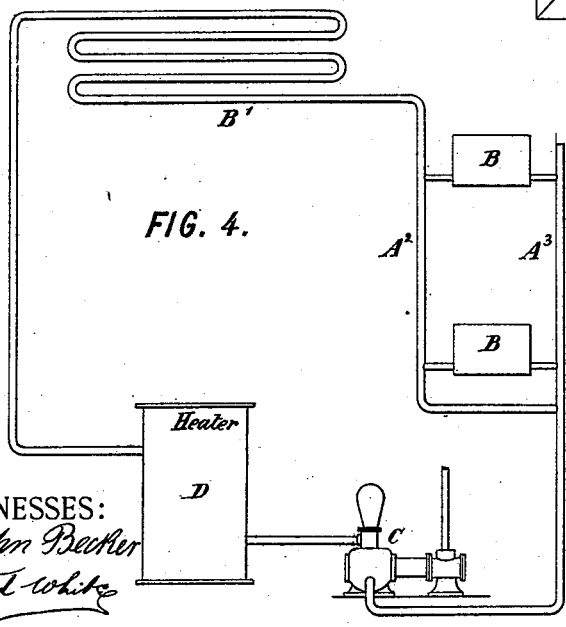
Figure 5:
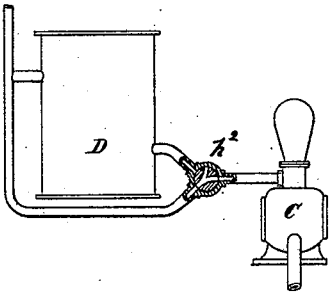

Figure 1 of the accompanying drawings is a vertical section of a building, illustrating the application thereto of my improved heating system. Fig. 2 is a sectional elevation of a suitable construction of electrically-actuated valve used in my invention. Fig. 3 is an elevation of a suitable construction of thermostatic circuit-closer. Fig. 4 is an elevation of a modified arrangement of heating-circuit, and Fig. 5 is a fragmentary elevation of a further modification thereof.

I will now describe the general system with reference to Fig. 1.

Let A A designate, as a whole, the liquid radiating-circuit, which may contain water or other suitable liquid, extending throughout the building and divided into branches containing radiators B B or other suitable radiating devices.

In the basement or other suitable location is arranged a steam-pump C, connected in the circuit with pipes $a$ $b$ thereof, controlled by suitable valves, so that by the operation of this pump the water in the circuit may be circulated. A branch or shunt pipe $cc$ is extended around the pump and controlled by a valve $c'$, so that by opening this and closing the valve $a'$ in the pipe $a$ the pump may be cut out of the circuit. This is designed to be done at night or at other times when the pump is not in operation, in order that the liquid may circulate of itself by reason of the difference in densities between its ascending and descending columns.

Two heaters D and E are connected serially or successively in the circuit, so that the liquid passes first through one and then through the other. The heater D is an exhaust-steam heater, being made of any suitable construction, by means of which the heat of the exhaust-steam from a steam-engine or other thing wherein steam is used may be utilized to impart heat to the liquid circuit A. The construction shown is well adapted for this purpose, consisting of an external drum or vessel $d$, into which the exhaust-inlet pipe $e$ opens and from which leads the exhaust-outlet pipe $f$, preferably made of larger area, in order that the exhaust-steam may escape with the least possible back-pressure. Within this drum $d$ is a coil or coils of pipe $g$, forming part of the circuit A A. The water or other liquid of this circuit in flowing through this coil is heated by the exhaust-steam in the chamber surrounding the coil. An outlet $d'$ is provided for conducting water of condensation away from the drum. In order to control the heating of the circuit by this heater D without interfering with the course of the exhaust-steam, I provide that when it is desired to reduce the temperature of the liquid in the circuit the liquid shall be passed around or exterior to the heater instead of being passed through it. For this purpose I provide the circuit A with a shunt A', or, in other words, I divide the circuit into two branches, in one of which is the coil $g$ of the heater D and in the other of which is the branch lettered A'. These branches are controlled by valves $h$ and $h'$, respectively, the one of which is designed to be closed when the other is open. Although two valves are preferable, yet a single three-way cock may be substituted therefor by placing it at the bifurcation of the two branches, as shown at $h^2$ in Fig. 5.

The heater E is the live-steam heater and may be of any suitable construction whereby live steam may be turned on and caused to communicate its heat to the liquid in the circuit A during the passage of the latter through the heater. The construction shown is well adapted for this purpose, and consists of an outer drum $i$, in which is placed a steam-coil $j$, fed by a supply-pipe $k$, and the water of condensation from which is removed through the pipe $k'$ in any suitable manner, as by means of any of the traps well known in the art. The pipes A A of the liquid circuit communicate with the interior of the drum $i$, so that the latter is kept filled with liquid, which circulates around the steam-pipes $j$ and consequently absorbs heat from them. The admission of steam to the coil $j$ is controlled by valves applied to the steam-admission pipe $k$, the valves shown being a hand-valve $l$ and two automatic valves $m$ and $n$, the operation of which will be described hereinafter.

In order to provide for expansion and contraction of the liquid in the circuit A, a relief-pipe F is provided, leading to a point higher than any portion of the circuit and there communicating with a tank or vessel G, called an "expansion-tank," into which the excess of liquid as it expands may flow.

The radiators B B may be arranged in any suitable way, being preferably exposed in cross branches between the portions $A^2$ and $A^3$ of the circulating-pipe in order that the circulation of liquid through them may be controlled independently of one another. When all the radiators are shut off, the liquid circulates through the pipe $A^4$, which may be controlled by a suitable valve, as shown. The radiators may be upright radiators, such as are commonly used in water-heating; or they may be coils of pipe, or other arrangements may be used, or the circulating-pipe A may be exposed and a portion of it utilized for the purpose of radiation, or this pipe may be coiled back and forth, as shown at B' in Fig. 4, and constitute a radiator. Hence by the expression "radiating-circuit" I mean a circuit or pipe through which the heat-conducting liquid is caused to circulate and which is either provided with radiators or a portion of the circulating-pipe itself is utilized as a radiator in order to radiate heat.

The general operation may now be understood. In ordinary cool or mild weather the steam is shut off from the heater E and the heater D is alone used. The circulation is started by means of the pump C, and is preferably maintained by constantly running this pump. The liquid circulates through the heater D, and thence is carried through the building, giving out the heat which was imparted to it, returning through the circuit to the heater, where heat is again restored to it. Whenever the building becomes too warm, the liquid in the circuit is cooled by passing it through the shunt A', instead of through the heater D, until its temperature has fallen sufficiently, whereupon it may be passed again through the heater D. By suitably alternating the course of the liquid its temperature, and consequently the temperature of the building, may be regulated to a nicety. I provide thermostatic means for controlling this alternation automatically, which I will describe hereinafter. Whenever the heater D is insufficient to maintain the liquid in the radiating-circuit at a sufficiently high temperature, steam is turned into the heater E, whereby the liquid in the circuit is heated to a higher degree. The heater E will ordinarily be used only in very cold weather. I contemplate controlling it wholly or in part by a thermostat exposed to the exterior temperature, so that when the temperature out of doors falls to 25° Fahrenheit or other predetermined temperature it will automatically turn on the steam to the heater E and keep it turned on until the external temperature rises to, say, 30°, or until the temperature within the building reaches a certain point, whereupon by automatic means the steam may be turned off from the heater E. The regulation may, however, be effected wholly by hand by discarding the automatic valves $m$ $n$ or by fastening them open. After the circulation in the circuit has once been started by the pump and the liquid has been heated up to its proper temperature the circulation may be maintained, although less rapidly, by the difference in density between the ascending column leading from the heater or heaters up to the radiators and the descending column leading from the radiators downward. The ascending column, being most highly heated, is of less density and tends to ascend, while the descending column, having given up a portion of its heat by radiation, is of greater density and tends relatively to descend. The circulation will consequently maintain itself indefinitely even after the stoppage of the pump. This circulation is relied upon for maintaining the heat of the building at night, when the pump will commonly be stopped.

I will now describe the thermostatic means for automatically operating the valves. These means comprise a thermostatic circuit-closer, one suitable construction of which is shown in Fig. 3, an electrically-operated pneumatic valve, one construction of which is shown in Fig. 2, and a pneumatically-operated steam or water valve, the operation of which will be sufficiently apparent from Fig. 1. These features are in themselves old and well known, and are illustrated here in order to make clear their connection with my improved heating system and to elucidate the method of automatic control thereof which my invention introduces. The thermostatic circuit-closer and electro-magnetic valves (shown in Figs. 2 and 3) differ somewhat in detail from constructions heretofore used to better adapt them to my purpose. The thermostatic circuit-closer H (shown in Fig. 3) is constructed with an insulating-base $p$, consisting of a plate of wood or other non-conducting material, a thermostatic spring or plate $q$, consisting of two metallic strips having different coefficients of expansion soldered together, the compound strip being fastened at one end to a standard $q'$ and carrying at the other end two contact-springs $r$. As the temperature falls the free upper end of the strip $q$ is deflected to the left, and as the temperature rises it is deflected toward the right. When the deflection in either direction becomes sufficient, one of the springs $r$ makes contact with two contact-screws $s\ s$, suitably mounted and insulated from each other, so that the spring $r$ forms a bridge or electric connection between the two screws of the pair. The screws are mounted in separate metallic brackets $s'\ s'$, to the binding-screws of which the circuit-wires 8 8 or 9 9, as the case may be, are connected. By referring to Fig. 1 it will be seen that these wires form parts of two circuits or two divisions of one circuit fed by a battery P, connected in an undivided portion 10 thereof, which branches into the two circuits 8 8 and 9 9, and these respective circuits are returned by wires 18 and 19 to the electro-pneumatic valve J, where they include the respective magnets M and M' thereof. If all the thermostats H H are cooled to the predetermined extent, their springs bridge the contacts $s\ s$ on the left and close the circuit 8 8 18, consequently exciting magnet M. If, on the contrary, they are all heated to a predetermined extent, they bridge the contacts on the right and close the circuit 9 9 19, thereby exciting magnet M'.

The construction of the valve J may be best understood from Fig. 2. The armature-lever N carries the armatures of the two magnets, and carries also some suitable construction of valve $t$, sliding over three ports (lettered 11, 12, and 13, respectively.) The port 11 communicates through a pipe $o$ with a source of compressed air or other fluid under pressure—for example, with a tank Q, containing compressed air. The port 12 communicates through a pipe $u$ with a pneumatic cylinder or diaphragm R, while port 13 communicates with the open air. The excitation of the magnet M' moves ports 11 and 12 into communication through the valve $t$, thereby admitting compressed air through pipe $o$ into pipe $u$, and thence into the cylinder R. The excitation of the magnet M moves the valve $t$ to close off the port 11 and put ports 12 and 13 into communication, thereby permitting compressed air to escape from the pipe $u$ and cylinder R. To hold the valve in either position and prevent any rebound, a spring $s^2$ is provided, the pressure of which is communicated through a toggle-arm $t'$ to an arm $t^2$, projecting from the armature-lever N, so that on either side of the center the tension of the spring acts to press the armature-lever N farther to that side and prevent its return. In order to prevent the continued closure of the circuit after either magnet has operated, with the consequent waste of electric energy, contact-springs $v\ v$ are provided, contacting with arcs on the ends of the armature-lever, so as to maintain contact therewith until the instant when the armature is fully attracted to its magnet, and thereupon break the circuit to the magnet which has last acted, while the circuit to the magnet which is next to act is closed, as clearly shown in Fig. 2. From the valve J the air-pipe $u$ is extended in two branches, a branch $u'$ leading to the pneumatic cylinder or diaphragm R and a branch $u^2$ leading to the pneumatic cylinder or diaphragm $R^2$. The diaphragm R acts to tilt a lever S against the tension of its spring, and thereby through chains or rods $v'\ v'$ will communicate motion to the operating-handles of the two valves $h\ h'$. The result of this connection is that when the temperature affecting all of the thermostats H H falls to the predetermined point the pneumatic valve J shuts off the compressed air from the diaphragm R and puts it into communication with the atmosphere, whereupon by the escape of its compressed air the lever S assumes under the tension of its spring the position shown in Fig. 1, thereby opening the valve $h$ and closing the valve $h'$. The liquid is consequently directed through the heater D, thereby increasing its temperature and heating the building to a higher degree. When the temperature rises sufficiently to deflect all the thermostats H to the right to a predetermined extent, the contrary operation of the valve J again admits compressed air into the diaphragm R, expanding it and tilting the lever S in the opposite direction, thereby closing the valve $h$ and opening valve $h'$, and consequently diverting the liquid through the shunt and around the heater D, so that the liquid radiating-circuit gradually closes. The diaphragm $R^2$, which acts simultaneously with the diaphragm R, serves to operate the valve $n$ in the steam-admission pipe to the live-steam heater. When the temperature in the building becomes too high, the valve $n$ is closed by the air-pressure acting on this diaphragm, and when the temperature becomes too low the air-pressure is exhausted and the valve $n$ opens, admitting steam to the heater E, provided the valve $m$ be also open. The valve $m$ is operated by the diaphragm R' receiving compressed air through the pipe $u^3$, leading from the pneumatic valve J', Fig. 1. This valve is of the same construction as the valve J, already described. Its magnets are in electrical connection with a thermostat H' of ordinary construction, which is placed either outside of the building or otherwise where it will be influenced by the external temperature—as, for example, in a cold-air flue. The thermic strip of this thermostat moves at its free end between two contact-screws 14 15, connected, respectively, in two branches 16 17 of the circuit of battery P'. The respective branches include the respective magnets of the pneumatic valve J'. Compressed air from the reservoir Q or other source is admitted to this valve through a pipe $o'$ and delivered therefrom through the pipe $u^3$ to the diaphragm R'. Whenever the external temperature falls below the predetermined degree, it acts upon the valve $m$ and admits steam to the heater E, provided the valve $n$ be also open. Whenever the external temperature rises above the predetermined degree, it acts to close the valve $m$, so as to shut off steam from the heater.

The thermostatic electro-pneumatic means for operating the several valves constitutes a refinement of my invention which is not essential thereto, but is desirable of employment in many cases.

My invention may be modified in many ways without departing from its essential features—as, for example, by omitting certain parts thereof, while retaining the remaining parts. For example, in some cases one of the two heaters may be omitted. Those features of my improved apparatus which are essential to my invention are defined in the claims following this specification.

I claim as my invention the following-defined novel features or improvements substantially as hereinbefore specified, namely:

1. A heating system for buildings, consisting of a liquid circuit, two successive heaters applied to said circuit to heat the liquid therein, an exhaust-steam pipe conducting exhaust-steam to heat one of said heaters, and a live-steam pipe conducting live steam to heat the other heater.

2. A heating system for buildings, consisting of a liquid circuit, an exhaust-steam heater applied to said circuit and adapted to heat the same by exhaust-steam, and a supplemental live-steam heater in operative contact with said circuit, with a valve for controlling the admission of live steam thereto, whereby the exhaust-steam heater may be used for heating said circuit in ordinarily cool weather and steam may be turned on to said supplemental heater for augmenting the heat of said circuit in very cold weather.

3. A heating system for buildings, consisting of a liquid circuit, an exhaust-steam heater in operative contact therewith, whereby the circuit may be heated in ordinarily cool weather by exhaust-steam through the medium of said heater, means for cutting off the heat of said exhaust-steam from said circuit when the building is sufficiently heated, a supplemental heater applied to said circuit, and means for controlling the admission of live steam to heat said supplemental heater, whereby in very cold weather the heat of said circuit may be augmented by introducing live steam to said supplemental heater.

4. A heating system for buildings, consisting of a liquid circuit, two successive heaters applied to said circuit to heat the liquid therein, an exhaust-steam pipe conducting exhaust-steam to heat one of said heaters, a live-steam pipe conducting live steam to heat the other heater, a valve for controlling the supply of steam to the latter heater and a shunt of said liquid circuit around said exhaust-steam heater, and valves for controlling the flow through said shunt or said latter heater, whereby the heating of the circuit by either heater can be controlled.

5. A heating system for buildings, consisting of a liquid circuit, two successive heaters applied to said circuit to heat the liquid therein, a live-steam pipe supplying one of said heaters, a thermostat arranged to be acted on by external temperature, and a valve in said steam-pipe actuated from said thermostat and adapted to admit steam to said heater only when the external temperature falls below a predetermined degree, whereby said circuit is automatically heated by only one of said heaters during mild weather and by both of them in the coldest weather.

6. A heating system for buildings, consisting of a liquid circuit, two successive heaters applied thereto, one heated by exhaust and the other by live steam, a shunt in said circuit around the exhaust-steam heater, valves for directing the flow through the heater or through the shunt, a valve for controlling the admission of live steam to heat the live-steam heater, electrically-actuated means for operating said valves, and one or more thermostats within the building in circuit connection within said means, the whole so connected and operating that when the temperature affecting the rheostats becomes too low the liquid is directed through the exhaust-steam heater and the said steam-admission valve to the live-steam heater is opened and when said temperature becomes too high said valve is closed and the liquid is directed through the shunt around the exhaust-steam heater.

7. A heating system for buildings, consisting of a liquid circuit, two successive heaters applied thereto, one heated by exhaust and the other by live steam, a shunt in said circuit around the exhaust-steam heater, valves for directing the flow through the heater or through the shunt, two valves for shutting off the admission of steam to the live-steam heater, a thermostat arranged to be acted on by external temperature, another thermostat arranged to be acted on by internal temperature, and electric means for operating the respective live-steam valves connected to and controlled by the respective thermostats, whereby live steam is admitted only when both the external and internal temperatures fall below the predetermined degrees.

In witness whereof I have hereunto signed my name in the presence of two subscribing witnesses.

QUIMBY N. EVANS.

Witnesses:
ARTHUR C. FRASER,
GEORGE H. FRASER.